(12) United States Patent
Sjöbeck et al.

(10) Patent No.: US 8,695,847 B2
(45) Date of Patent: Apr. 15, 2014

(54) DISPENSER UNIT FOR COUNTERMEASURES

(75) Inventors: Benny Sjöbeck, Hässelby (SE); Robert Melin, Sollentuna (SE); Björn Zachrisson, Sollentuna (SE)

(73) Assignee: SAAB AB, Linköping (SE)

( * ) Notice: Subject to any disclaimer, the term of this patent is extended or adjusted under 35 U.S.C. 154(b) by 198 days.

(21) Appl. No.: 13/144,950

(22) PCT Filed: Jan. 16, 2009

(86) PCT No.: PCT/SE2009/050043
§ 371 (c)(1),
(2), (4) Date: Sep. 29, 2011

(87) PCT Pub. No.: WO2010/082882
PCT Pub. Date: Jul. 22, 2010

(65) Prior Publication Data
US 2012/0012608 A1    Jan. 19, 2012

(51) Int. Cl.
*F42B 12/70* (2006.01)
(52) U.S. Cl.
USPC ............. 221/153; 221/151; 221/227; 102/505
(58) Field of Classification Search
USPC ........ 102/505; 244/136, 137.3; 221/151, 152, 221/153, 227, 247, 251, 269
See application file for complete search history.

(56) References Cited

U.S. PATENT DOCUMENTS

| | | | |
|---|---|---|---|
| 1,364,569 A * | 1/1921 | McNulty | 221/152 |
| 3,430,533 A | 3/1969 | Kifor et al. | |
| 3,511,457 A * | 5/1970 | Pogue | 244/137.3 |
| 4,247,017 A * | 1/1981 | Guigan | 221/227 |
| 4,417,709 A * | 11/1983 | Fehrm | 244/136 |
| 5,631,441 A | 5/1997 | Briere et al. | |
| 5,663,518 A * | 9/1997 | Widmer | 102/505 |
| 5,773,745 A | 6/1998 | Widmer | |
| 7,600,477 B2 * | 10/2009 | Zatterqvist | 102/505 |
| 8,033,225 B2 * | 10/2011 | Friede et al. | 102/505 |

FOREIGN PATENT DOCUMENTS

| | | |
|---|---|---|
| DE | 2522927 B1 | 11/1976 |
| EP | 1194331 B1 | 5/2004 |
| EP | 1950522 A1 | 7/2008 |
| FR | 2665875 A1 | 2/1992 |
| GB | 2023263 A | 12/1979 |
| WO | WO-02/093102 A1 | 11/2002 |

OTHER PUBLICATIONS

PCT/ISA/210—International Search Report—Sep. 23, 2009.
PCT/ISA/237—Written Opinion of the International Searching Authority—Sep. 23, 2009.
PCT/IPEA/409—International Preliminary Report on Patentability—Apr. 1, 2011.

* cited by examiner

*Primary Examiner* — Timothy Waggoner
(74) *Attorney, Agent, or Firm* — Venable LLP; Eric J. Franklin

(57) ABSTRACT

A dispenser unit for countermeasures. A magazine for the countermeasures is removably arranged on the dispenser unit. A dispensing nozzle dispenses the countermeasures out of the magazine. A movable seal is arranged within the magazine. The seal in a first position covers the dispensing nozzle and in a second position opens the dispensing nozzle, such that the countermeasures may be dispensed through the dispensing nozzle when the seal is in the second position.

15 Claims, 9 Drawing Sheets

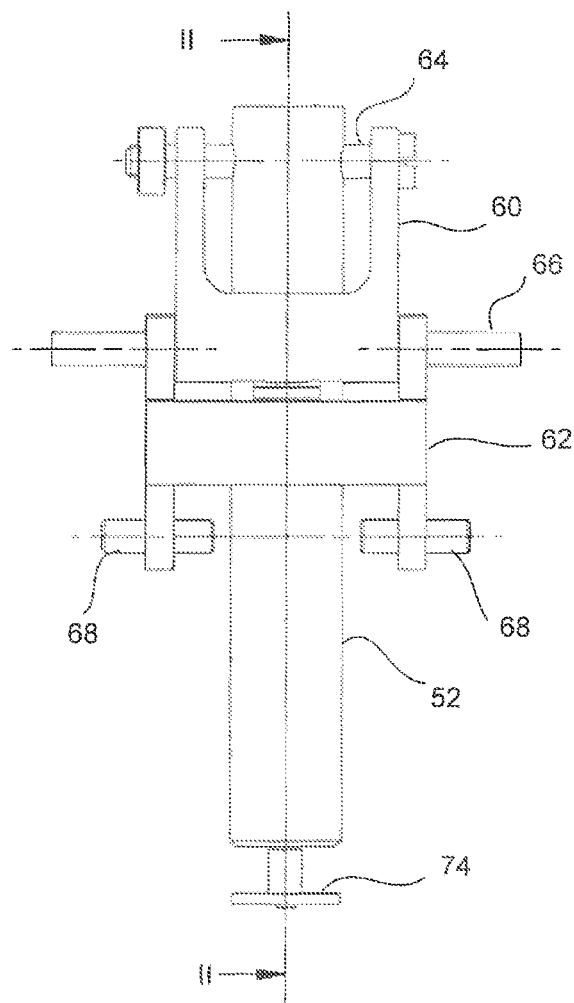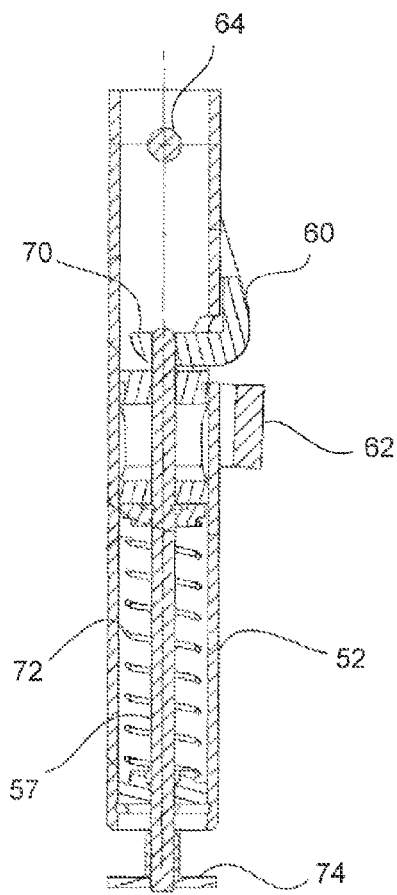
Fig. 9a                    Fig. 9b

DISPENSER UNIT FOR COUNTERMEASURES

CROSS-REFERENCE TO RELATED APPLICATIONS

This application is the national phase under 35 U.S.C. §371 of PCT/SE2009/050043 filed 16 Jan. 2009.

TECHNICAL FIELD

This invention relates to a dispenser unit for countermeasures.

BACKGROUND ART

Dispenser units arranged to dispense countermeasures from aircrafts are well known. Both fighter and transport aircrafts, as well as civil aircrafts are exposed for threats from self-guided missiles equipped with radar, IR or laser sensors, which can be fired either from other aircrafts or from the ground. In order to protect the threatened aircrafts from an attack of such missiles they are provided with various types of dispenser units which dispense countermeasure means. Such countermeasure means may comprise aluminized foil or fibers, hot IR chaff, and also laser-reflecting fibers or foils, which confuse and divert missiles aimed at the aircraft.

The dispenser units are often enclosed in capsules or cases arranged under the wings or under the fuselage of the aircraft. The countermeasures are dispensed out of a dispensing nozzle arranged at the dispenser unit. Since the dispenser unit is used only when the air craft is exposed for threats the dispensing unit may be inactivated during a long period of time. Under such period the countermeasures within the dispenser unit must be protected against the air flow and water or particles in the air flow which may come into the dispenser unit and reach the countermeasures, and as a result damage the countermeasures. Also, during handling of the dispenser unit it is important that the countermeasures not fall out of the dispenser unit.

Document WO-A1-02/093102 discloses a dispenser intended for discharging countermeasure means. The dispenser is build into a modified rocket capsule which is intended for originally unguided attack rockets. The capsule may be arranged under the wings of the aircraft or under the aircraft fuselage.

Another prior art dispenser unit is disclosed in U.S. Pat. No. 5,631,441. The dispenser unit is provided with an enclosure for a pyrophoric liquid. A repturing disc is arranged at a nozzle for dispensing the liquid.

The objective problem to be solved by the present invention is to improve the handling safety of a dispenser unit for countermeasures.

Another objective problem to be solved by the present invention is to reduce the air flow into a dispenser unit.

A further objective problem to be solved by the present invention is to prevent countermeasures to unintentionally fall out of a dispenser unit for countermeasures

SUMMARY OF THE INVENTION

The above objects are achieved by a dispenser unit for countermeasures.

Such an arrangement provides for a minimized or eliminated air flow into the dispenser unit and into the magazine of the dispenser unit, because of the sealing means which covers the dispensing nozzle. The air flow may have a negative influence on the countermeasures stored within the magazine, especially if water or particles in the air flow may come into the magazine. When replacing the magazine it is important that the countermeasures do not fall out of the magazine. When the sealing means is in the sealed first position the countermeasures cannot fall out of the dispensing nozzle of the magazine.

BRIEF DESCRIPTION OF THE DRAWINGS

Further advantages and features of the invention can be derived from the following detailed description of exemplary embodiments of the invention, with reference to the drawings.

DETAILED DESCRIPTION

Figure 1:
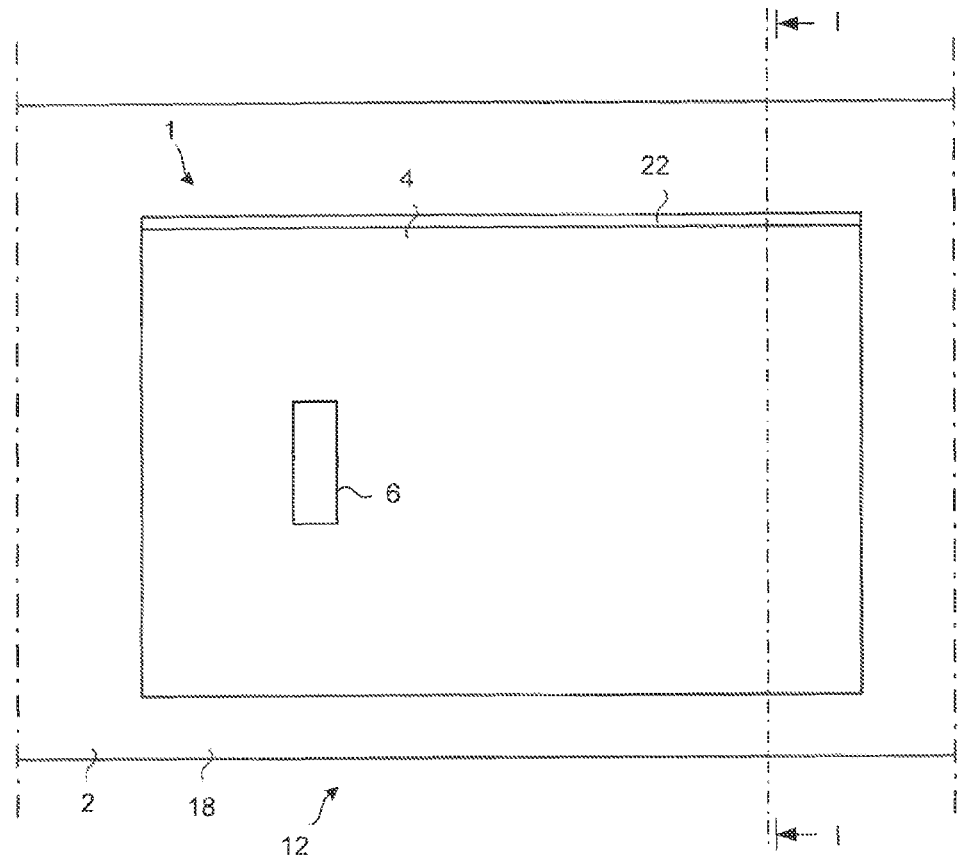
FIG. 1 is a side view of an aircraft fuselage.
Figure 2:
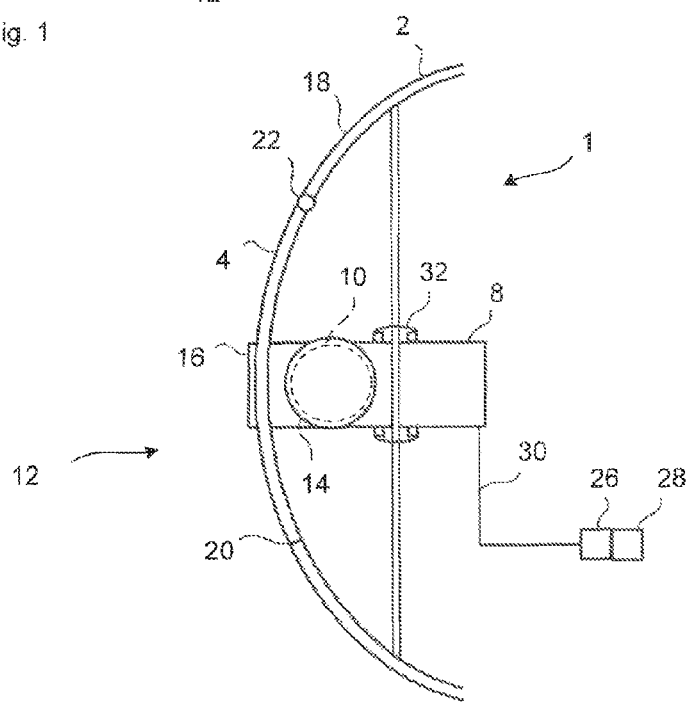
FIG. 2 is a cross section view of along line I-I in FIG. 1.
Figure 3:
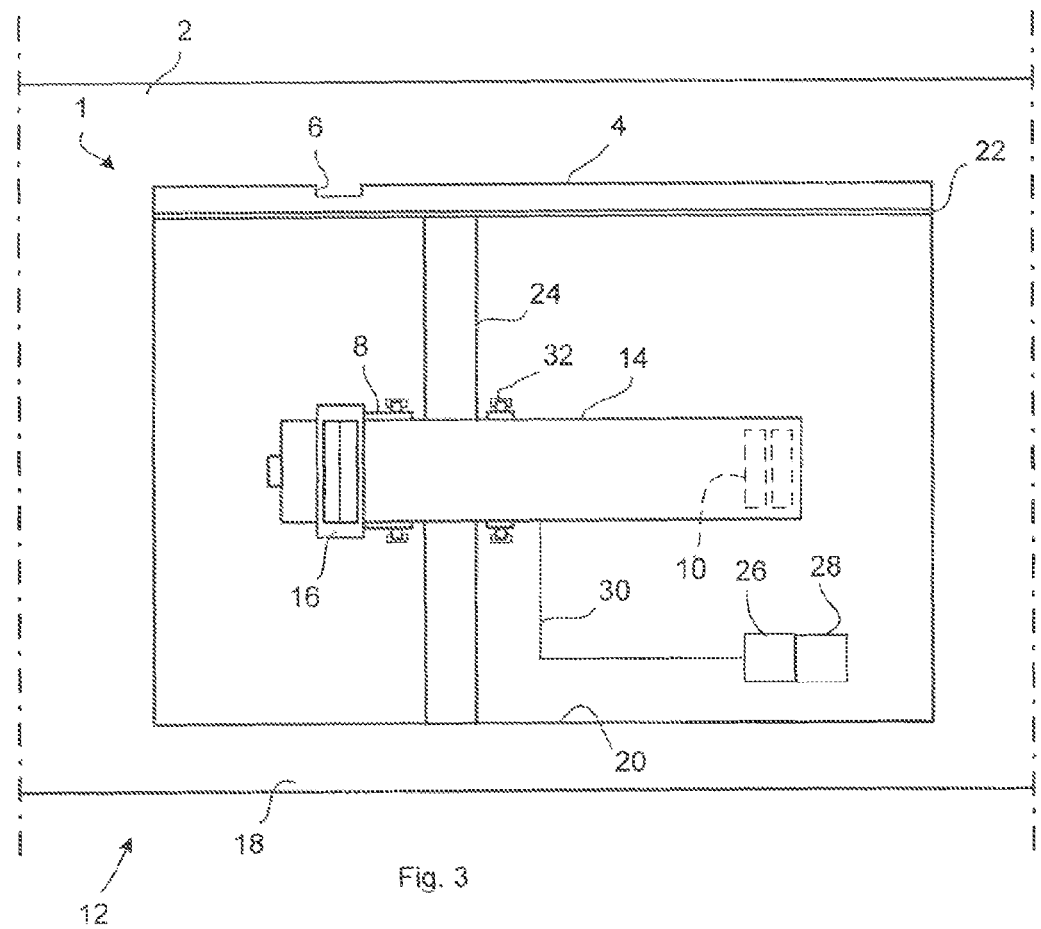
FIG. 3 is a side view of the aircraft fuselage with an opened hatch.

In FIGS. 1-3 a dispenser unit 8 according to the invention arranged within an aircraft fuselage 2 is disclosed. FIG. 1 is a side view of the aircraft fuselage 2 provided with a hatch 4. In the hatch 4 an aperture 6 is arranged, out of which countermeasures 10 are intended to be dispensed. FIG. 2 is a cross section view of along line I-I in FIG. 1. The aircraft 12 can be a fighter or a transport aircraft, as well as a civil aircraft, which may be exposed for threats from self-guided missiles equipped with radar, IR or laser sensors. Such missiles can be fired either from other aircrafts or from the ground.

In order to protect a threatened aircraft from an attack of such missiles the dispenser unit 8 dispenses countermeasure means. The countermeasure means may comprise aluminized foil or fibers, hot IR chaff, and also laser-reflecting fibers or foils, which confuse and divert missiles aimed at the aircraft.

The dispenser unit 8 is provided with a magazine 14 for the countermeasures 10 and a dispensing nozzle 16 through which the countermeasures 10 are dispensed or ejected. The countermeasures 10 may be ejected by any suitable means within the dispensing unit, such as an ejecting piston, an explosive charge or a pressurised gas.

The aperture 6 in the hatch 4 is arranged to substantially coincide with the dispensing nozzle 16. Preferably the aperture 6 has a substantially similar form and size as the dispensing nozzle 16. The hatch 4 covers an opening 20 in the wall 18 of the aircraft fuselage 2. The aperture 6 is arranged in the hatch 4, so when the hatch 4 is closed and covers the opening 20 the aperture 6 coincides with the dispensing nozzle 16. The hatch 4 is preferably movable connected to the wall 18 of the aircraft fuselage 2 by one or several hinges 22.

In FIGS. 1 and 2 the hatch 4 is closed and covers the opening 20. The main flight direction of the aircraft 12 according to the figures is substantially out of the cross section view of the aircraft fuselage 2 in FIG. 2.

A substantially vertical bracket 24 is arranged within the aircraft fuselage 2 and the dispenser unit 8 is mounted on the bracket 24.

A control unit 26 which comprises a power supply is connected to the dispenser unit 8. In order to increase the flexibility of mounting the dispenser unit 8 within the aircraft fuselage 2 it is preferably possible to arrange the control unit 26 and the power supply unit 28 at a distance from the dispenser unit 8. The control unit 26 and the power supply unit 28 are connected to the dispenser unit 8 by electrical cables 30. It is also possible to arrange the control unit 26 and the power supply unit 28 as two separate units.

FIG. 3 is a side view of the aircraft fuselage 2 with an opened hatch 4. The opening 20 in the wall 18 of the aircraft fuselage 2 has a form and size which substantially is adapted to the form and size of the magazine 14 for the countermeasures 10, so that is possible to replace the magazine 14 through the opening 20 in the wall 18. Thus, with such an opening 20 in the wall 18 of the aircraft fuselage 2 the magazine 14 can easily and quickly be replaced by a magazine 14 loaded with countermeasures 10. Preferably the magazine 14 for countermeasures 10 is connected to the dispenser unit 8 with snap fastener means 32, such as latches. In FIG. 3 the magazine 14 is connected to the dispensing unit with four latches. When using snap fastener means 32 the magazine 14 can easily and quickly be replaced by a magazine 14 loaded with countermeasures 10.

Before removing the magazine 14 the hatch 4 is opened and the latches are unlocked and released from the magazine 14. Thereafter the magazine 14 is removed from the dispenser unit 8 and out of the opening 20. Arranging a new or loaded magazine 14 at the dispenser unit 8 is performed in the opposite order.

Figure 4:
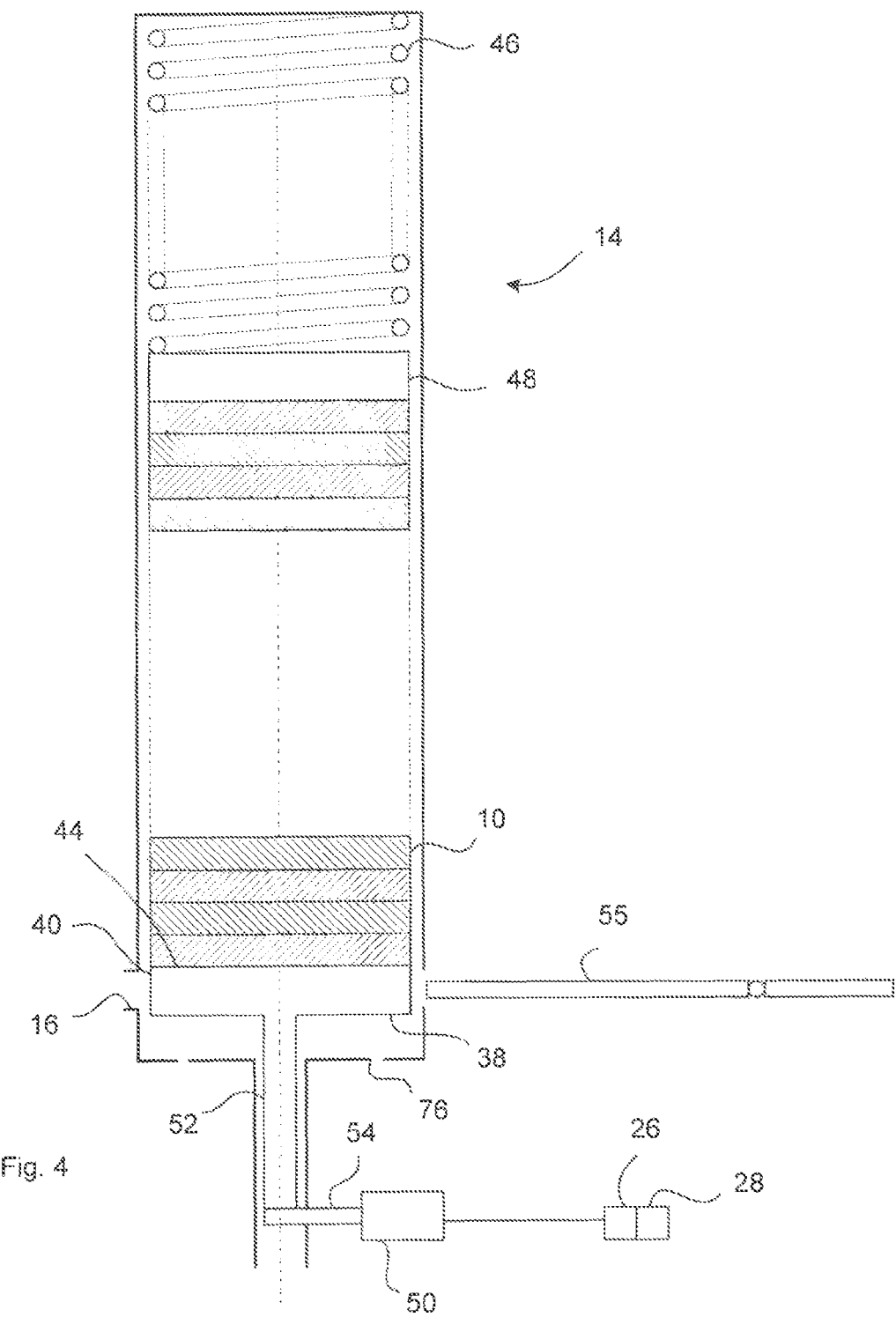
FIG. 4 is a cross section view of a magazine according to a first embodiment of the present invention with a sealing means in a first position.

FIG. 4 discloses a cross section view of a magazine 14 according to a first embodiment of the present invention. A movable sealing means 38 is arranged within the magazine 14. In FIG. 4 the sealing means 38 is in a first position and covers the dispensing nozzle 16. FIG. 4 schematically discloses the magazine 14 and the sealing means 38. Therefore, the sealing means 38 in FIG. 4 is arranged at a distance from the dispensing nozzle 16. However, in reality the sealing means 38 covers the dispensing nozzle 16 in the first position, so that air flow and water or particles in the air flow may not come into the magazine 14. Also, when the sealing means 38 is in the sealed first position the countermeasures 10 cannot fall out of the dispensing nozzle 16 of the magazine 14.

Figure 5:
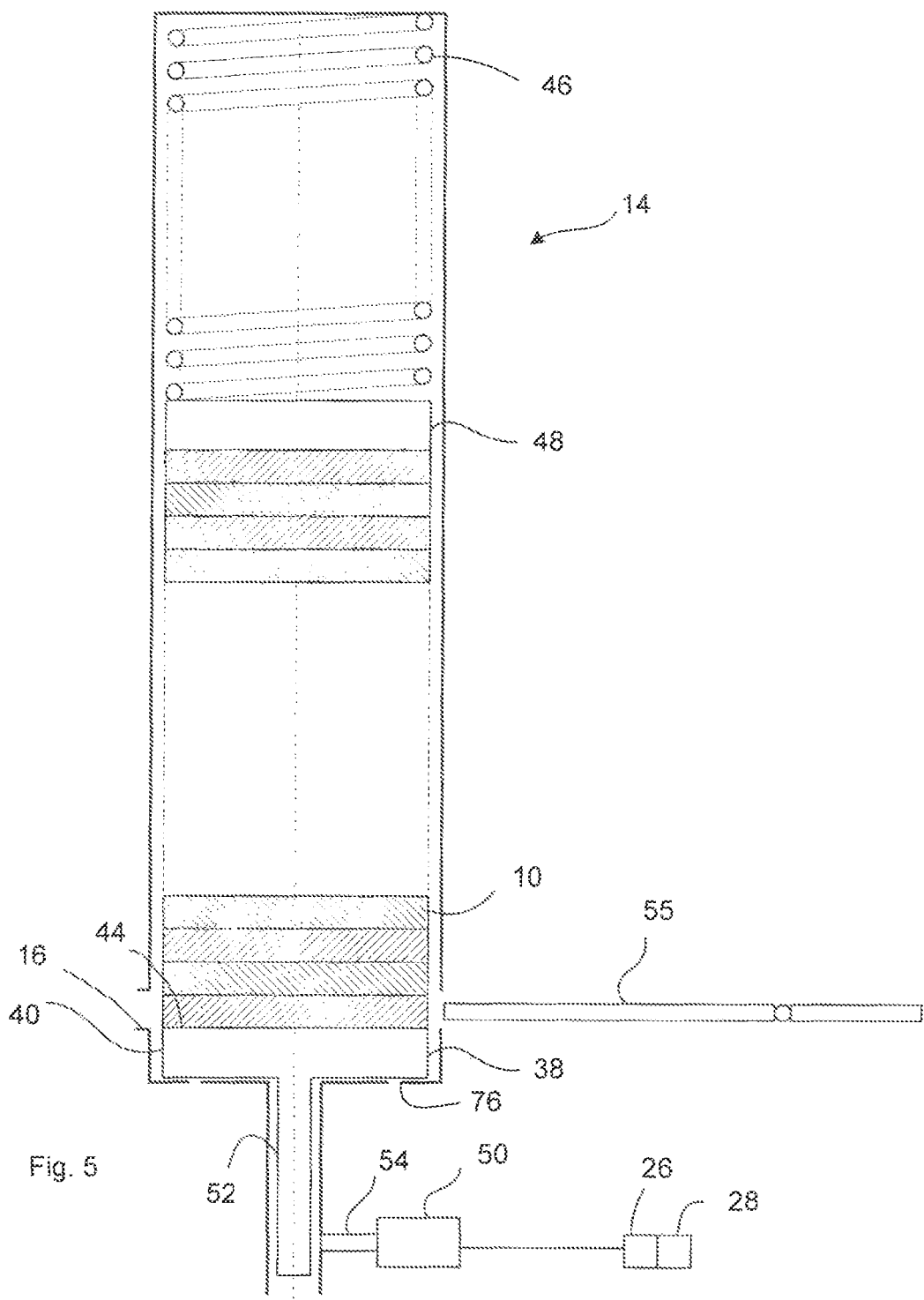
FIG. 5 is a cross section view of the magazine according to FIG. 4, with the sealing means in a second position.

In FIG. 5 the movable sealing means 38 has been moved to a second position, so the sealing means 38 opens the dispensing nozzle 16. The countermeasures 10 may be dispensed through the dispensing nozzle 16 when the sealing means 38 is in the second position.

Preferably, the sealing means 38 is a substantially circular disc 38, which is arranged to slide on an inner wall of the magazine 14 when moving from the first to the second position. The disc 38 is provided with a periphery comprising a sealing surface 40 which is arranged to seal against an inner wall of the magazine 14. The disc 38 may have any other form, such as an elliptical form. The disc 38 may be provided with a sealing ring 42, which is arranged on the periphery of the disc 38.

The disc 38 comprises a supporting surface 44 on which the countermeasures 10 abut in the magazine 14. The supporting surface 44 also is a sliding surface on which the countermeasures 10 slide when dispensed through the dispensing nozzle 16.

A biasing means 46 is arranged within the magazine 14 to feed the countermeasures 10 in a direction of the dispensing nozzle 16. In the embodiment according to FIGS. 4 and 5 the biasing means 46 is a compression spring 46, which acts on a compression piston 48. The compression spring 46 is arranged to move the sealing disc 38 from the first to the second position.

An activation means 50 is arranged to release the sealing means 38 from a locked condition in the first position. In the first embodiment disclosed in FIG. 4 a centre shaft 52 connected to the sealing disc 38 is axially locked by a movable pin 54 of the activation means 50. When retracting the pin 54 of the activation means 50 the centre shaft 52 is free to move in an axial direction. Thus, when the movable pin 54 is retracted the sealing disc 38 is pushed to the second position disclosed in FIG. 5 by the compression spring 46. Preferably, a control unit 26 comprising a power supply unit 28 is connected to the activation means 50. The movable pin 54 is preferably a solenoid 54.

Figure 6:
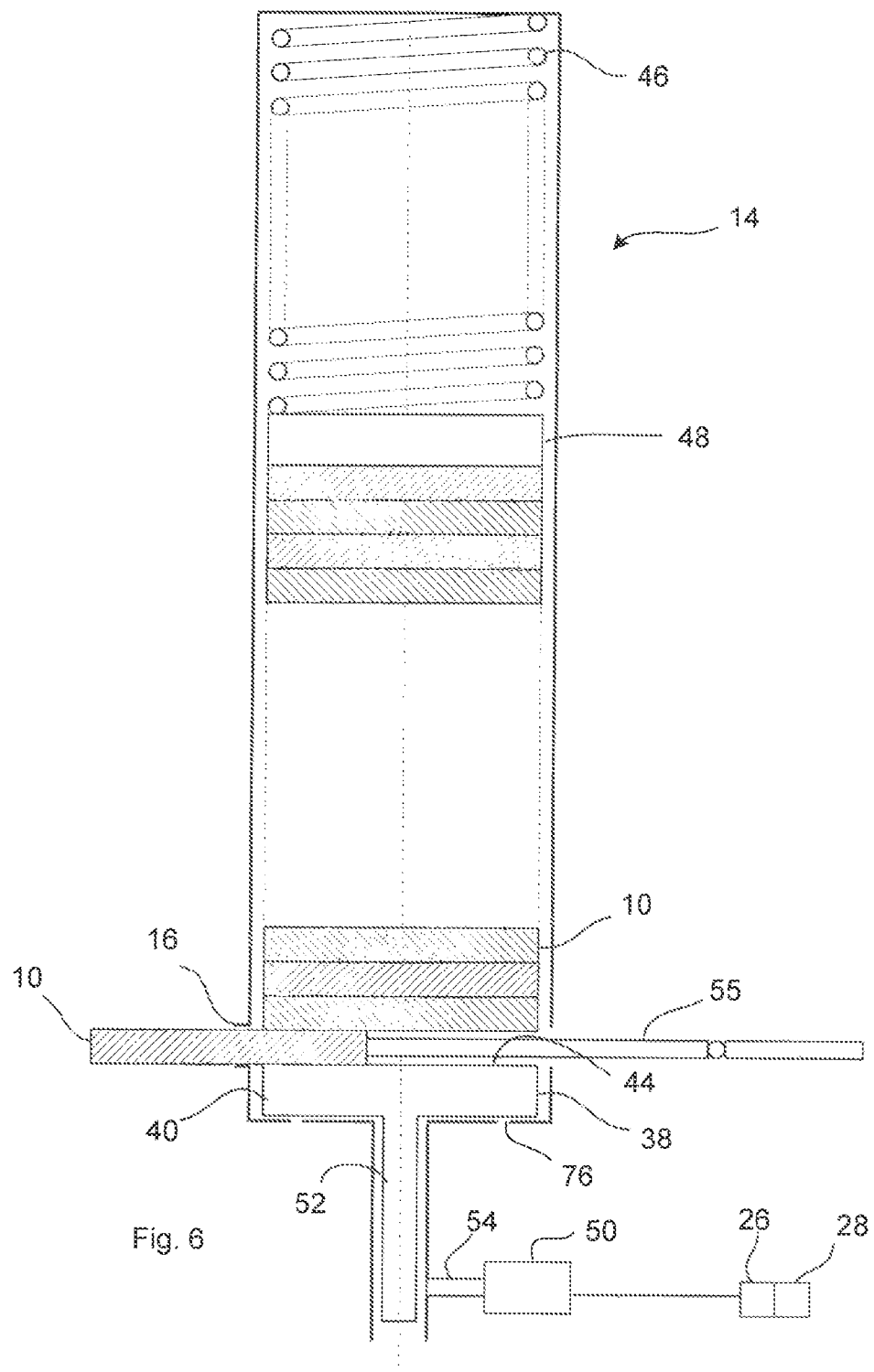
FIG. 6 is a cross section view of the magazine according to FIG. 5, disclosing a countermeasure which is going to be dispensed out of a dispensing nozzle.

FIG. 6 is a cross section view of the magazine 14 according to the first embodiment, disclosing a countermeasure 10 which is going to be dispensed out of a dispensing nozzle 16. An ejection means 55, which may be an ejection piston 55 disclosed in FIG. 6 pushes the countermeasures 10 out of the magazine 14 and out of the dispensing nozzle 16.

Figure 7:
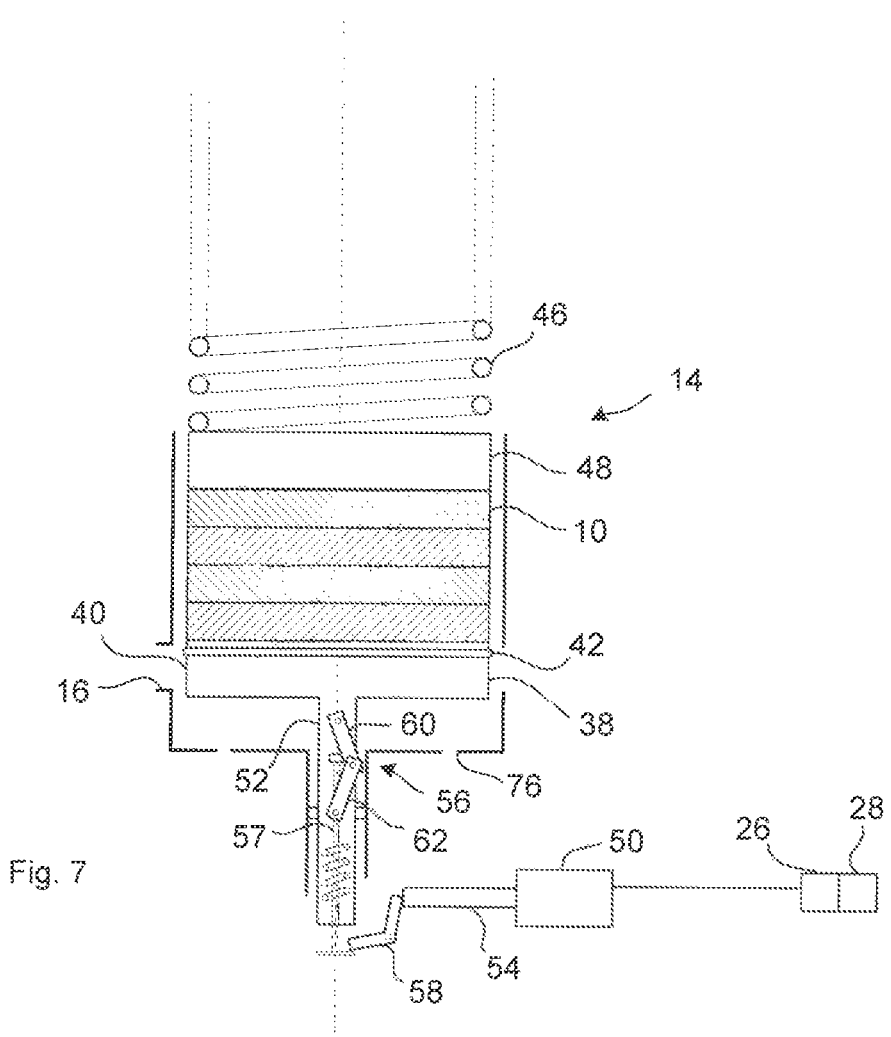
FIG. 7 is a cross section view of a magazine according to a second embodiment of the present invention with a sealing means in a first position.
Figure 8:
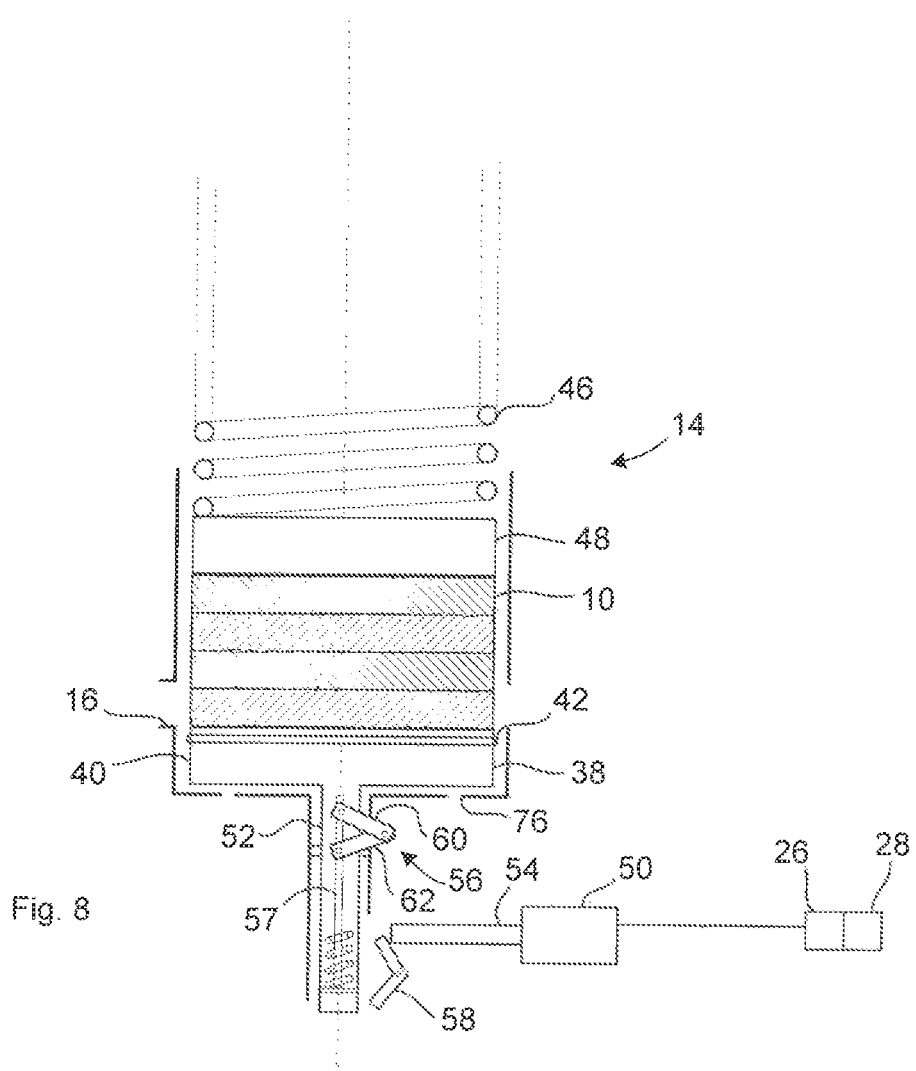
FIG. 8 is a cross section view of the magazine according to FIG. 7, with the sealing means in a second position, FIG. 9a-9b disclose a knee joint 56 according to the second embodiment of the invention, and FIG. 10a-10c disclose a countermeasure comprising a cassette accommodating a chaff.

FIGS. 7 and 8 disclose a second embodiment of a magazine 14 according to the present invention. According to this second embodiment a knee joint 56 locks the sealing means 38 in the first position and the activation means 50 acts on the knee joint 56 when releasing the sealing means 38 from the locked condition in the first position. The activation means 50 according to the second embodiment is preferably also a solenoid 54 controlled by a control unit 26. A centre shaft 52 connected to the sealing disc 38 is axially locked by the knee joint 56. When a pin 54 of the activation means 50 pushes a rocker means 58 a centre rod 57 will be pushed down by the rocker means 58 and as a result the rocker means 58 releases the knee joint 56 that will collapse. The centre shaft 52 is then free to move in an axial direction and the sealing disc 38 is pushed to the second position disclosed in FIG. 8 by the compression spring 46.

FIGS. 9a and 9b disclose the knee joint 56 more in detail. FIG. 9a is a side view of the knee joint 56 and FIG. 9b is a cross section view of the knee joint 56 along line III-III in FIG. 9a. The knee joint 56 comprises first and second arms 60, 62. The first arm 60 is pivotally connected to the centre shaft 52 with a first axle 64 and to the second arm 62 with a second axle 66. The second arm 62 is also pivotally connected to the wall of the magazine 14 with third axles 68. The first arm 60 is provided with a protrusion 70 into which the centre rod 57 is realisably inserted. Preferably the centre shaft 52 is a hollow tube into which the protrusion 70 of the first arm 60 may be inserted through an opening in the side of the tube wall. A spring element 72 is installed within the tube and surrounds the centre rod 57. In the end of the rod 57 an abutment plate 74 is arranged, which abutment plate 74 is designed to co-operate with the rocker means 58. As mentioned above, when the pin 54 of the activation means 50 pushes the rocker means 58 the centre rod 57 will be pushed down by the rocker means 58 and as a result the rocker means 58 and the centre rod 57 releases the knee joint 56 that will collapse.

In the disclosed embodiments is at least one restriction hole 76 arranged in a wall of the magazine 14. The sealing disc 38 creates a gas flow through the restriction hole 76 when moving from the first to the second position in order to control the velocity of the sealing disc 38. The number and size of the restriction holes 76 may be adapted to the desired velocity of the sealing disc 38.

Preferably, the countermeasures 10 comprise a cassette 78 which accommodates a chaff or IR-decoy. Several of such countermeasures 10 are stackable in the magazine 14.

Figure 10A:
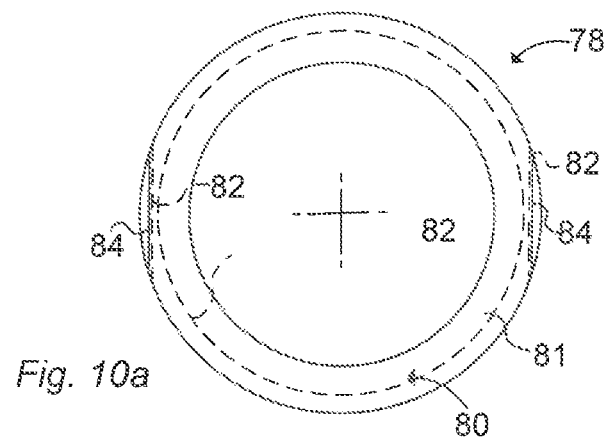
Figure 10B:
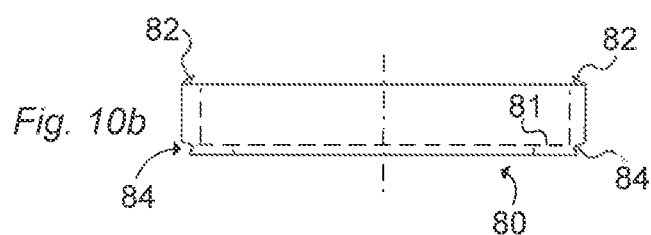
Figure 10C:
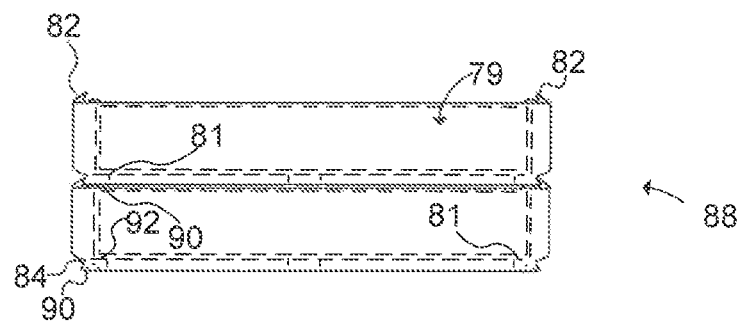

FIGS. 10a-10c schematically illustrate a cassette 78 being designed for accommodating an insert 79 in the form of a chaff or IR-decoy. The chaff is preferably enveloped within an envelope, which is connected to a parachute (not shown). The parachute is used to rip of the envelope from the chaff after being dispensed from an aircraft 12. For example pyrophoric infrared decoys (CIV-IR) are used to avoid an incoming infrared seeking missile (not shown).

FIG. 10a shows the cassette 78 from the underside, wherein a base portion 80 is designed in the form of a circular flange 81 onto which the insert 79 can rest. FIG. 10b shows a side view of the cassette 78 in FIG. 10a. Two hooks 82 and two longitudinal recesses 84 are arranged in the circular flange 81 opposite the hooks 82. The recesses 84 are adapted for co-operation with the hooks 82 of the front coupled identical cassette 78 (see FIG. 10c). The hooks 82 and the recesses 84 are thus arranged for releasable attachment to a subsequent coupled identical cassette 78 and/or in front coupled identical cassette 78, for forming the stack 88 of cassettes 78. Thereby a set of cassettes 78 can be hold together in the stack 88, which stack 88 can be loaded in a magazine 14 connectable to the dispenser unit 8. The magazine 14 is in itself releasable coupled to the dispenser unit 8 of the air craft 12, such that easy mounting/replacement of a loaded magazine 14 can be achieved. The stack 88 provides for an easy loading of the magazine 14.

FIG. 10c shows a portion of a stack 88, wherein two cassettes 78 are coupled together via the hooks 82 and recesses 84. The insert 79 rests against the supporting surface 44 of the circular flange 81 and also against the underside 90 of the next cassette's 78 circular flange 81.

The invention claimed is:

1. A dispenser unit for countermeasures, comprising:
   a magazine for the countermeasures removable arranged on the dispenser unit,
   a dispensing nozzle for dispensing the countermeasures out of the magazine, and
   a movable seal arranged within the magazine, wherein the seal in a first position covers the dispensing nozzle and in a second position opens the dispensing nozzle, so that the countermeasures may be dispensed through the dispensing nozzle when the seal is in the second position.

2. The dispenser unit according to claim 1, further comprising:
   a biasing unit arranged within the magazine to feed the countermeasures in a direction of the dispensing nozzle.

3. The dispenser unit according to claim 1, wherein the seal comprises a supporting surface on which the countermeasures abut in the magazine.

4. The dispenser unit according to claim 3, wherein the supporting surface also is a sliding surface on which the countermeasures slide when dispensed through the dispensing nozzle.

5. The dispenser unit according to claim 2, wherein the biasing unit is arranged to move the seal from the first position to the second position.

6. The dispenser unit according to claim 1, further comprising:
   an activation unit arranged to release the seal from a locked condition in the first position.

7. The dispenser unit according to claim 6, further comprising:
   a knee joint configured to lock the seal in the first position and the activation unit acts on the knee joint when releasing the seal from the locked condition in the first position.

8. The dispenser unit according to claim 6, further comprising:
   a control unit connected to the activation unit.

9. The dispenser unit according to claim 8, wherein the control unit comprises a power supply unit.

10. The dispenser unit according to claim 1, further comprising:
    at least one restriction hole arranged in a wall of the magazine, wherein the seal creates a gas flow through the at least one restriction hole when moving from the first position to the second position in order to control a velocity of the seal.

11. The dispenser unit according to claim 1, wherein the dispenser unit is arranged within an aircraft fuselage, the dispenser unit further comprising:
    an aperture for dispensing the countermeasures arranged in the outer wall of the aircraft fuselage, wherein the aperture is arranged to substantially coincide with the dispensing nozzle.

12. The dispenser unit according to claim 1, wherein the seal comprises a substantially circular disc.

13. The dispenser unit according to claim 12, wherein the disc is arranged to slide on an inner wall of the magazine when moving from the first position to the second position.

14. The dispenser unit according to claim 12, wherein the disc comprises a peripherally arranged sealing surface which is arranged to seal against an inner wall of the magazine.

15. The dispenser unit according to claim 1, wherein the countermeasures comprise a cassette which accommodates a chaff and wherein several countermeasures are stackable in the magazine.

* * * * *

UNITED STATES PATENT AND TRADEMARK OFFICE
CERTIFICATE OF CORRECTION

| | |
|---|---|
| PATENT NO. | : 8,695,847 B2 |
| APPLICATION NO. | : 13/144950 |
| DATED | : April 15, 2014 |
| INVENTOR(S) | : Sjobeck et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 244 days.

Signed and Sealed this
Eleventh Day of August, 2015

Michelle K. Lee
*Director of the United States Patent and Trademark Office*